United States Patent
Xu

(10) Patent No.: US 10,320,188 B2
(45) Date of Patent: Jun. 11, 2019

(54) POWER ADAPTER, POWER DEVICE AND OUTPUT DEVICE

(71) Applicant: Delta Electronics (Shanghai) Co., Ltd., Shanghai (CN)

(72) Inventor: Dao-Fei Xu, Shanghai (CN)

(73) Assignee: DELTA ELECTRONICS (SHANGHAI) CO., LTD., Shanghai (CN)

(*) Notice: Subject to any disclaimer, the term of this patent is extended or adjusted under 35 U.S.C. 154(b) by 295 days.

(21) Appl. No.: 15/007,170

(22) Filed: Jan. 26, 2016

(65) Prior Publication Data

US 2017/0063081 A1 Mar. 2, 2017

(30) Foreign Application Priority Data

Aug. 27, 2015 (CN) .................... 2015 2 0655663 U

(51) Int. Cl.
| H02J 1/00 | (2006.01) |
| H02M 3/158 | (2006.01) |
| H02M 7/04 | (2006.01) |
| H02M 1/00 | (2006.01) |

(52) U.S. Cl.
CPC ............. *H02J 1/00* (2013.01); *H02M 3/158* (2013.01); *H02M 7/04* (2013.01); *H02M 2001/007* (2013.01)

(58) Field of Classification Search
CPC .... Y02T 10/7005; Y02T 90/14; Y02T 90/127
See application file for complete search history.

(56) References Cited

U.S. PATENT DOCUMENTS

| 7,826,240 B2 * | 11/2010 | Xu ......................... H02M 7/217 363/142 |
| 2008/0137379 A1 * | 6/2008 | Mao ...................... H02M 3/157 363/17 |
| 2009/0251127 A1 * | 10/2009 | Kim ..................... G01R 22/063 324/76.11 |
| 2013/0119783 A1 * | 5/2013 | Xu .......................... H02J 7/025 307/125 |
| 2014/0181549 A1 | 6/2014 | Chueh et al. |
| 2015/0084529 A1 * | 3/2015 | Otake ..................... H02M 7/06 315/200 R |

FOREIGN PATENT DOCUMENTS

| CN | 2624469 Y | 7/2004 |
| TW | I293518 B | 2/2008 |

* cited by examiner

*Primary Examiner* — Sibin Chen
(74) *Attorney, Agent, or Firm* — CKC & Partners Co., LLC

(57) ABSTRACT

A power adapter is disclosed herein. The power adapter includes an AC-DC converter, at least one output port, at least one DC transmission cable and at least one connector. The AC-DC converter is configured to convert an input AC voltage to an intermediate DC voltage. The output port is configured to output the intermediate DC voltage. A second terminal of the DC transmission cable is connected to the output port and configured to receive and transmit the intermediate DC voltage. The connector is connected to a first terminal of the DC transmission cable and configured to output an output voltage. The connector includes a first housing, a DC-DC converter and an output terminal. The DC-DC converter is enclosed in the first housing and configured to convert the intermediate DC voltage to the output voltage. The output terminal is enclosed in the first housing and configured to transmit the output voltage.

20 Claims, 3 Drawing Sheets

POWER ADAPTER, POWER DEVICE AND OUTPUT DEVICE

RELATED APPLICATIONS

This application claims priority to Chinese Application Serial Number 201520655663.7, filed Aug. 27, 2015, which is herein incorporated by reference.

BACKGROUND

Technical Field

The present disclosure relates to a power adapter, and in particular, to a power adapter configured to supply power to an electronic device.

Description of Related Art

Nowadays, AC/DC power adapters are widely used in different applications. It converts AC mains to a low level dc voltage to power various of electronic device. Usually a DC transmission cable is applied to transmit the dc voltage from the AC/DC adapter to the electronic device. For the convenience in use, the DC transmission cable is required to be long enough (e.g. 1.8 meters for notebook PC adapter application). Under such circumstance, the impedance of the DC transmission cable can't be neglectable and there is a voltage drop between two terminals of the DC transmission cable, which increases as the transmitted power increases. The power loss due to the impedance of the transmission cable results in lower efficiency, and the actual voltage supplied to the electronic device may be lower than expectation, and may cause malfunction of the device in some applications.

SUMMARY

One aspect of the present disclosure is a power adaptor. The power adapter includes an AC-DC converter, at least one output port, at least one DC transmission cable and at least one connector. The AC-DC converter is configured to convert an input AC voltage to an intermediate DC voltage. The output port is configured to output the intermediate DC voltage. A second terminal of the DC transmission cable is connected to the output port and configured to receive and transmit the intermediate DC voltage. The connector is connected to a first terminal of the DC transmission cable and configured to output an output voltage. The connector includes a first housing, a DC-DC converter and an output terminal. The DC-DC converter is enclosed in the first housing and configured to convert the intermediate DC voltage to the output voltage. The output terminal is enclosed in the first housing and configured to transmit the output voltage.

Another aspect of the present disclosure is a power device in a power adapter. The power device includes an input terminal configured to receive an input ac voltage, an ac-dc converter configured to convert the input ac voltage to an intermediate dc voltage, and at least one output port configured to output the intermediate dc voltage. The intermediate dc voltage is not tight regulated. The intermediate dc voltage is not less than 5 volts.

Yet another aspect of the present disclosure is an output device accompanied with the power device. The output device includes a dc transmission cable configured to receive and transmit the intermediate dc voltage, and a connector connected to a first terminal of the dc transmission cable and configured to receive the intermediate dc voltage and output an output voltage. The connector includes a first housing, a dc-dc converter enclosed in the first housing and configured to convert the intermediate dc voltage to the output voltage, and an output terminal enclosed in the first housing and configured to transmit the output voltage.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
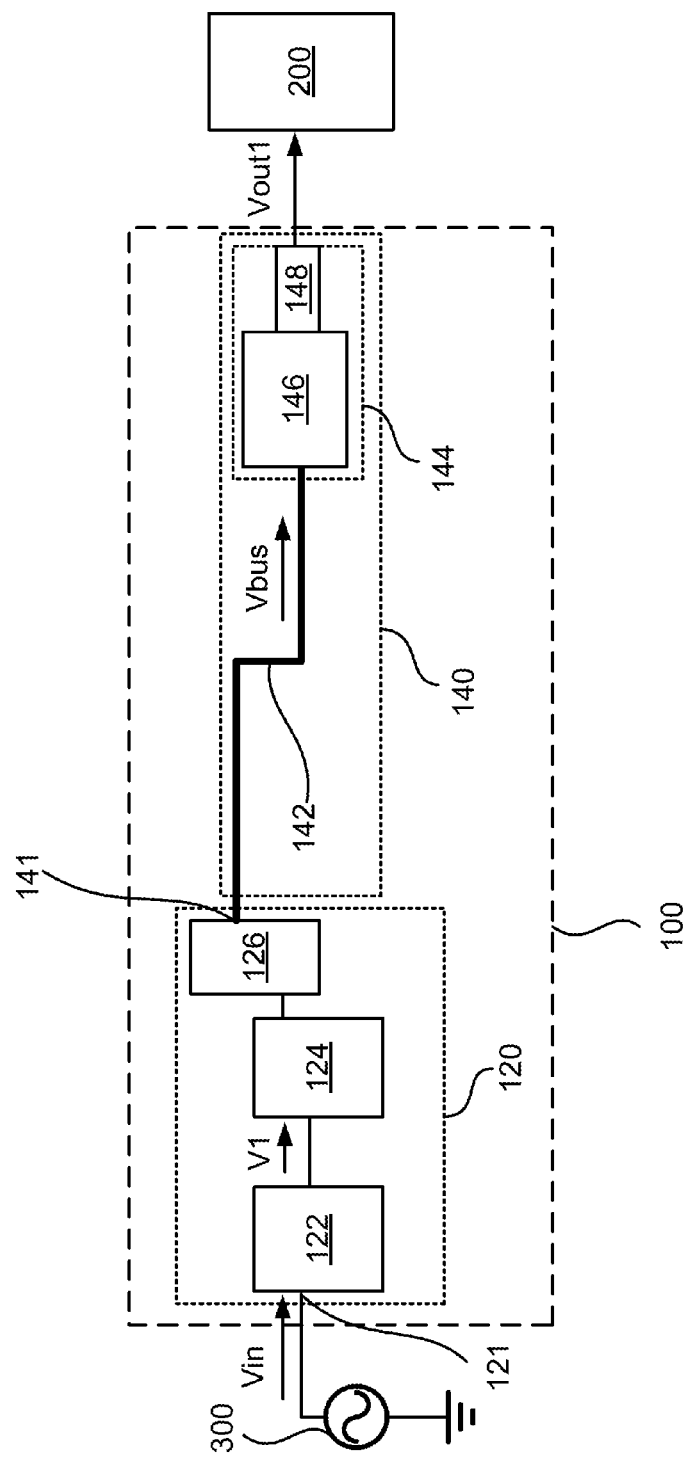
FIG. 1 is a schematic diagram illustrating a power adaptor according to an embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a schematic diagram illustrating a power adapter 100 according to an embodiment of the present disclosure. As illustratively shown in FIG. 1, the power adapter 100 is configured to receive an input ac voltage Vin from an ac power source 300, and output an output voltage Vout1 to supply power to the external device 200. The power adapter includes a power device 120 and an output device 140, in which the output device 140 includes a dc transmission cable 142 and a connector 144. In various embodiments of the present disclosure, the external device 200 may be a personal computer, a laptop, a tablet, other portable electronic device such as a smartphone, but not limited thereto.

In the present embodiment, the input ac voltage Vin may be an ac power source provided from the grid. For example, the input ac voltage may be AC power about 90~264 volts. The power device 120 is configured to receive ac voltage Vin from the input terminal 121 and convert the input ac voltage Vin to an intermediate dc voltage Vbus.

Specifically, the power device 120 may include ac-dc converter to convert the input ac voltage Vin to intermediate dc voltage Vbus. The ac-dc converter is configured to receive the input ac voltage Vin and output the intermediate dc voltage Vbus. For one skilled in the art, the input terminal 121 may be a wall-mounted input terminal and installed to the power lines in the wall to receive the ac voltage Vin, or a power plug input terminal configured to receive the ac voltage Vin via the power plug from the power socket. The ac-dc converter includes a rectifying unit 122 and isolated dc-dc converting unit 124. The rectifying unit 122 may be implemented with various rectifiers such as half-wave rectifiers, full-wave bridge rectifiers, center-tap rectifiers, and configured to convert the ac voltage Vin to a dc voltage V1. The isolated dc-dc converting unit 124 is connected to the rectifying unit 122 and configured to convert the dc voltage V1 to the intermediate dc voltage Vbus. Specifically, the isolated dc-dc converting unit 124 may be implemented by flyback converters, forward converters, half-bridge converters, full-bridge converters, push-pull converters, etc. In the present embodiment, the intermediate dc voltage Vbus is not less than 5 volts.

In addition, the power device 120 further includes at least one output port 126 coupled to the isolated dc-dc converting unit 124. In one embodiment, the power device 120 further includes a housing which encloses the ac-dc converter and the at least one output port 126. In one embodiment, the power device 120 further include at least one connecting line, in which the first terminal of the each connecting line is connected to the ac-dc converter, and the second terminal of the each connecting line is connected to one corresponding output port 126, the power device 120 further includes a housing which encloses the ac-dc converter and the first terminal of the each connecting line.

Specifically, the output device 140 includes a dc transmission cable 142 and a connector 144. The second terminal 141 of the dc transmission cable 142 is connected to the output port 126 of the power device 120, and configured to transmit the intermediate dc voltage Vbus from the power device 120 to the connector 144. The connector 144 is connected to a first terminal of the dc transmission cable 142 and configured to be connected to the external device 200 to supply power to the external device 200. In the present embodiment, the intermediate dc voltage Vbus may be higher than the output voltage Vout1. For example, the intermediate dc voltage Vbus may be any value between 5 volts to 60 volts, such as 5V, 10V, 30V, 40V, or 48V. The output voltage Vout1 may be 5V, 12V, or 20V dc voltage, but not limited thereto. The voltage may be designed according to the actual needs. The length of the dc transmission cable 142 may be adjusted according to the actual needs. For example, the length of the dc transmission cable 142 may be any value between about 0.5 m to 3 m, such as 0.5 m, 1.2 m, 1.6 m, 1.8 m, or 2.5 m.

Specifically, the connector 144 may include a dc-dc converter 146. The dc-dc converter 146 is configured to convert the intermediate dc voltage Vbus to the output voltage Vout1 according to the actual needs of the external device 200, thus the intermediate dc voltage can be not tight regulated, for example, the intermediate dc voltage Vbus can vary in a range of ±25%, so that the design of the power device 120 can be more simple. Compared to the prior art, however, the connector 144 doesn't includes the dc-dc converter 146, so the output voltage from the power device 120 must be tight regulated. Of course, in one embodiment, the intermediate dc voltage can be tight regulated. In one embodiment, the dc-dc converter 146 is a non-isolated power converting circuit. In one embodiment, the dc-dc converter 146 is a non-isolated buck power converter circuit.

As illustratively shown in the figure, in the present embodiment, the connector 144 may also include a housing and an output terminal 148, the dc-dc converter 146 and the output terminal 148 are enclosed in the housing. Specially, a first node of the output terminal 148 is connected to the dc-dc converter 146, and is enclosed in the housing such that the output terminal 148 and the dc-dc converter 146 are fixedly connected, and a second node of the output terminal 148 may be configured to connect to an external device 200, thus the output terminal 148 may be configured to receive and transmit the output voltage Vout1, such that the output device 140 may supply power to the external device 200 connected to the output device 140. In some embodiments, the output terminal 148 may be formed by a hard and conductive material. In some embodiments, the second node of the output terminal 148 is plug-in connected to the external device 200. For example, the external device 200 includes a plug-in hole and the output terminal 148 plugs in the hole. For example, in some embodiments, the output terminal 148 and the plug-in hole may be an universal serial bus (USB) interface.

In one embodiment, in order to minimize the volume of the dc-dc converter 146 to be integrated in the connector 144, the dc-dc converter 146 is designed to work at high frequency (e.g., frequency around 1 MHz). Thus, in one embodiment, the switches of the dc-dc converter 146 are implemented by semiconductor elements such as Si-MOSFETs. In another embodiment, the switches of the dc-dc converter 146 are implemented by novel semiconductor elements such as GaN HEMTs. And in one further embodiment, the switches of the dc-dc converter 146 are implemented by both Si-MOSFETs and GaN HEMTs.

In one embodiment, dc-dc converter 146 includes a synchronous rectifier unit to reach better conversion efficiency. In another embodiment, the synchronous rectifier unit is implemented by a GaN HEMT.

Thus, by transmitting the intermediate dc voltage Vbus via the dc transmission cable 142 to the connector 144, and using the dc-dc converter 146 in the connector 144 to convert the intermediate dc voltage Vbus to the output voltage Vout1, the output voltage Vout1 is not affected by the actual voltage drop due to the power loss in the transmission cable. In addition, in some embodiments, if the intermediate dc voltage Vbus is higher than the output voltage Vout1, the transmission current through the dc transmission cable 142 is lower with same transmission power, so the power loss of the transmission cable 142 is decreased and the total power conversion efficiency is improved.

In some embodiments, the second terminal 141 of the dc transmission cable 142 and the output port 126 are fixedly connected. In some embodiments, the second terminal 141 of the dc transmission cable 142 and the output port 126 are detachably connected. For example, the second terminal 141 of the dc transmission cable 142 includes a connecting terminal connected to the output port 126. In some embodiments, the connecting terminal is a plug and the output port 126 is a plughole, and the plug is plug-in connected to the plughole.

Thus, when the power devices 120 are equipped at each place such as home, offices, or schools, the user may bring the portable output device 140 and connect the output device 140 to the local power device 120 to supply power to the external device 200 without bringing the large-sized power device 120, which is more convenient in use.

Figure 2:
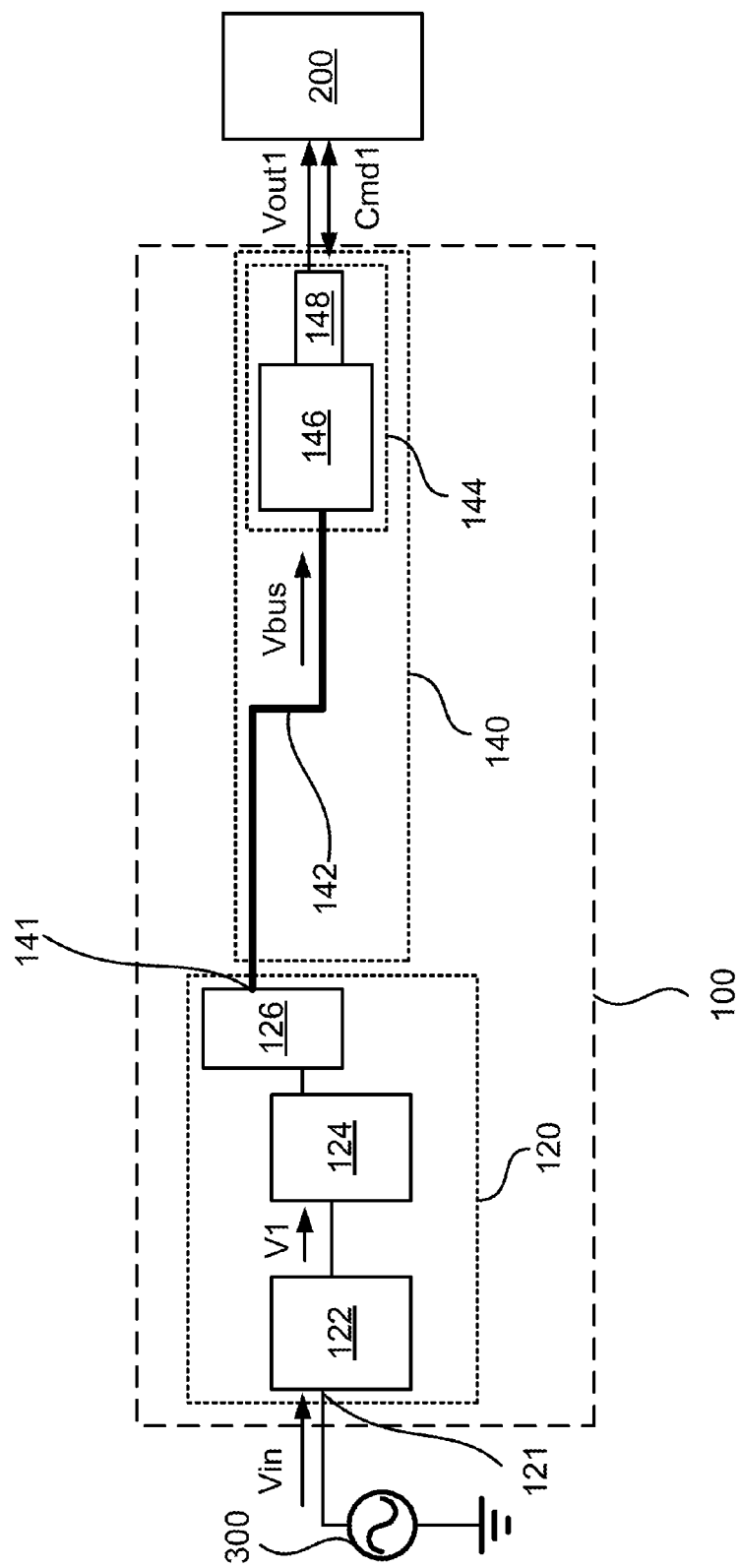
FIG. 2 is a schematic diagram illustrating a power adaptor according to an embodiment of the present disclosure.

Reference is made to FIG. 2. FIG. 2 is a schematic diagram illustrating a power adapter 100 according to an embodiment of the present disclosure. In the present embodiment, the dc-dc converter 146 in the connector 144 of the output device 140 may be configured to output the output voltage Vout1 according to a communication signal Cmd1 from the external device 200. In some embodiments, the communication signal Cmd1 is a digital pulse signal from the external device 200 or a voltage signal, a resistor signal, or any other suitable signal reflecting the state of the external device 200. Thus, the output terminal 148 is configured to transmit the communication signal Cmd1, and the output device 140 may be able to receive and transmit the communication signal Cmd1 from the external device 200 via the output terminal 148 to the dc-dc converter 146 to output the output voltage Vout1. In an embodiment, the output terminal 148 may also be able to transmit a communication signal Cmd1 from the dc-dc converter 146 to the external device 200 too, for example, inform the external device 200 the output capacity of the dc-dc converter 146 or to confirm whether dc-dc converter 146 had received the communication signal Cmd1 from the external device 200, or any other suitable signal outputted by the dc-dc converter 146.

For example, in the embodiment that the output terminal 148 of the connector 144 is connected to the external device 200 using the USB interface, the communication signal Cmd1 may be transmitted between the dc-dc converter 146 and the external device 200 using the voltage signal of the D+ pin and/or the D− pin to determine the voltage desired by the external device 200, and then adjust the output voltage Vout1 correspondingly, but the present disclosure is not limited thereto. In some embodiments, other communication pin may be used to transmit the communication signal Cmd1 between the dc-dc converter 146 and external device 200, and then the dc-dc converter 146 adjusts the output voltage Vout1 correspondingly. For example, when the external device 200 is a tablet or a smartphone, the dc-dc converter 146 in the connector 144 may be controlled to output 12V or 5V output voltage Vout1 according to the communication signal Cmd1.

Thus, the power adaptor 100 does not need to transmit the communication signal Cmd1 back to the power device 120 via the dc transmission cable 142 in order to adjust the voltage using the ac-dc converter in the power device 120. Alternatively stated, extra signal lines are not needed to be arranged in the dc transmission cable 142, and the dc transmission cable 142 may only include power transmission line to transmit the intermediate dc voltage Vbus, and the design cost and the manufacturing cost of the output device 140 are reduced.

Figure 3:
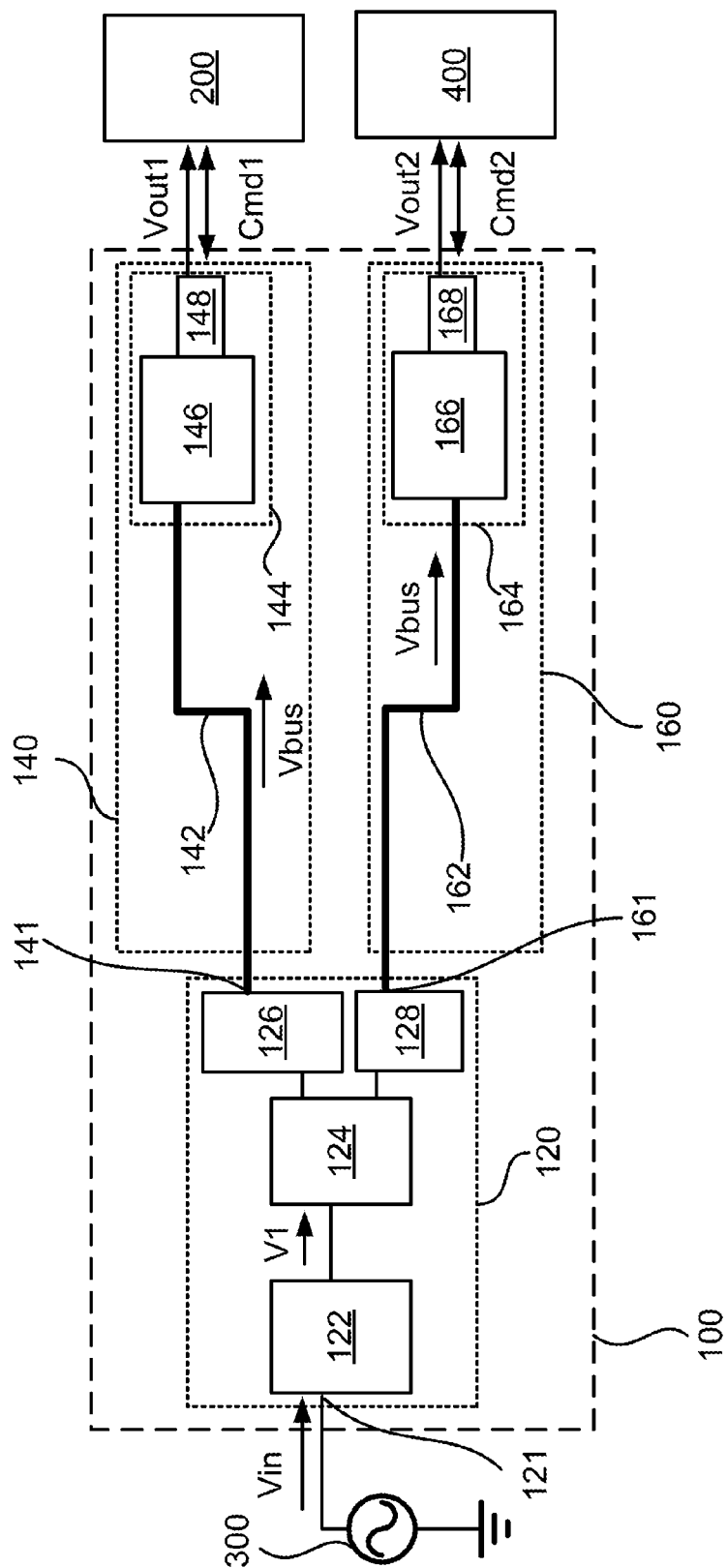
FIG. 3 is a schematic diagram illustrating a power adaptor according to an embodiment of the present disclosure.

Reference is made to FIG. 3 in accompanied with FIG. 2. FIG. 3 is a schematic diagram illustrating a power adaptor 100 according to an embodiment of the present disclosure. In the present embodiment, the power adaptor 100 further include output device 160. In the output device 160, the second terminal 161 of dc transmission cable 162 is connected to another output port 128 of the power device 120, and configured to transmit the intermediate dc voltage Vbus from the power device 120 to the connector 164. The connector 164 is configured to be connected to the external device 400 and output the output voltage Vout2 to supply power to the external device 400.

In the present embodiments, the intermediate dc voltage Vbus may be higher than the output voltage Vout2. For example, in an embodiment that the intermediate dc voltage Vbus is 48Vdc, the output voltage Vout2 may be 5V, 12V, 20V, etc., and the voltage may be adjusted according to actual needs. The length of the dc transmission cable 162 may also be adjusted according to the actual needs. It is noted that, similar to the connector 144, the connector 164 in the present embodiments also includes a housing, dc-dc converter 166 and an output terminal 168, and the dc-dc converter 166 is configured to convert the intermediate dc voltage Vbus to the output voltage Vout2. The output terminal 168 is configured to receive and transmit the output voltage Vout2 to the external device 400.

Since the power device 120 includes multiple output ports 126 and 128, and the output ports 126 and 128 are connected to the connector 144 and 164 via the dc transmission cable 142 and 162 respectively, to output the intermediate dc voltage Vbus to the connector 144 and 164, the connectors 144 and 164 convert the intermediate dc voltage Vbus to the output voltage Vout1 and Vout2 to supply power to the external devices 200 and 400 respectively. Thus the power adaptor 100 may be able to charge different external devices 200 and 400 at the same time. It is noted that the number of the output port may be adjusted according to actual need, and the embodiment shown in FIG. 3 is only for illustration purpose and not meant to limit the present disclosure.

In addition, similar to the above embodiments, the power adaptor 100 may receive corresponding communication signals Cmd1 and Cmd2 via the output terminals 148 and 168 to output the voltage needed by the external devices 200 and 400, and using dc-dc converter 146 and 166 to adjust the output voltage Vout1 and Vout2 respectively, Alternatively stated, the output voltage Vout1 and Vout2 may be different according to different types of the external devices 200 and 400. For example, when the output voltage Vout1 is 20V, the output voltage Vout2 may be 5V.

In addition, as mentioned in the above paragraphs, in some embodiments the dc transmission cables 142 and 162 are detachably connected to the output port 126 and 128 of the power device 120. Thus the power device 120 and the output device 140 and 160 may be portable separately and flexibly used according to actual needs. For example, different users may bring the output device 140 and 160, and connect the output device 140 and 160 to the same power device 120 at a place. Thus, multiple users may charge the external devices 200 and 400 using the power device 120 at the same time, and the convenience in use is enhanced.

In the present disclosure, by applying the various embodiments discussed above, using the power device 120 to convert the input ac voltage Vin to the intermediate dc voltage Vbus, and integrating the dc-dc converter 146 and 166 in the connector 144 and 164 respectively such that the intermediate dc voltage Vbus is converted to the output voltage Vout1 and Vout2 by the dc-dc converter 146 and 166 in the connector 144 and 164 respectively. In addition, in some embodiments, if the intermediate dc voltage Vbus is higher than the output voltage Vout1 and Vout2, the power loss in the dc transmission cable 142 and 162 is reduced and the overall conversion efficiency is improved. In addition, the signal lines in the dc transmission cables 142 and 162 are not needed and thus reducing the manufacturing cost and the diameter of the transmission cables. Furthermore, by the power adaptor 100 in the present disclosure, the voltage of the output voltage Vout1 and Vout2 are not affected by the actual voltage drop due to the power loss in the dc transmission cables 142 and 162.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power adapter, comprising:
   an ac-dc converter configured to convert an input ac voltage to an intermediate dc voltage;
   at least two output ports configured to output the intermediate dc voltage respectively;
   at least two dc transmission cables, wherein a second terminals of the at least two dc transmission cables are detachably connected to the at least two output ports respectively and configured to receive and transmit the intermediate dc voltage respectively; and
   at least two connectors, connected to first terminals of the at least two dc transmission cables respectively, wherein each of the at least two connectors comprises:
   a first housing;
   a dc-dc converter enclosed in the first housing and configured to convert the intermediate dc voltage to an output voltage to an external device; and
   an output terminal is detachably connected to the external device to directly transmit the output voltage to the external device, wherein a node of the output terminal enclosed in the first housing is directly connected to the dc-dc converter to receive the output voltage and another node of the output terminal is plugged into the external device to directly transmit the output voltage to the external device,
   wherein the at least two connectors are detachably connected to the external devices and provide adjustable output voltages to the external devices respectively.

2. The power adapter of claim 1, wherein the dc transmission cable only comprises power transmission line configured to transmit the intermediate dc voltage.

3. The power adapter of claim 1, wherein the dc-dc converter comprises a non-isolated buck power converting circuit, configured to convert the intermediate dc voltage to the output voltage.

4. The power adapter of claim 3, wherein the non-isolated buck power converting circuit comprises a synchronous rectifier unit.

5. The power adapter of claim 4, wherein the synchronous rectifier unit comprises a GaN HEMT.

6. The power adapter of claim 3, wherein the non-isolated buck power converting circuit comprises at least one of a GaN HEMT and a Si-MOSFET.

7. The power adapter of claim 1, wherein the output terminal is further connected to the external device, and the output terminal is configured to transmit a communication signal between the DC-DC converter and the external device while transmitting the output voltage to the external device.

8. The power adapter of claim 7, wherein the dc-dc converter is configured to output the output voltage according to the communication signal from the external device.

9. The power adapter of claim 1, wherein further comprises a second housing, the second housing encloses the ac-dc converter and the at least one output port.

10. The power adapter of claim 1, wherein further comprises at least one connecting line, first terminal of the each connecting line is connected to the ac-dc converter, and second terminal of the each connecting line is connected to one of the output ports; and a second housing encloses the ac-dc converter and the first terminal of the each connecting line.

11. The power adapter of claim 1, wherein the intermediate dc voltage is between 5 volts to 60 volts.

12. The power adapter of claim 11, wherein the intermediate dc voltage is not tight regulated.

13. A power device in a power adapter, comprising:
   an input terminal configured to receive an input ac voltage;
   an ac-dc converter configured to convert the input ac voltage to an intermediate dc voltage, wherein the intermediate dc voltage is not tight regulated;
   at least two output ports configured to output the intermediate dc voltage respectively, wherein the intermediate dc voltage is not less than 5volts; and
   at least two output devices accompanied with the at least two output ports, wherein one of the at least two output devices comprise:
   a dc transmission cable, wherein a second termail of the dc transmission cable is detachably connected to one of the at least two output ports and configured to receive and transmit the intermediate dc voltage; and
   a connector connected to a first terminal of the dc transmission cable and configured to receive the intermediate dc voltage and output an output voltage to an external device, wherein the connector comprises:
   a first housing;
   a dc-dc converter enclosed in the first housing and configured to convert the intermediate dc voltage to the output voltage to the external device; and
   an output terminal is detachably connected to the external device to directly transmit the output voltage to the external device, wherein a node of the output terminal enclosed in the first housing is directly connected to the dc-dc converter to receive the output voltage and another node of the output terminal is plugged into the external device to directly transmit the output voltage to the external device, wherein the connector is detachably connected to the external devices and provide adjustable output voltage to the external devices.

14. The power device of claim 13, wherein the at least one output port is configured to output the intermediate dc voltage to at least one output device such that the output device convert the intermediate dc voltage to an output voltage to supply power to an external device connected to the output device.

15. The power device of claim 13, wherein the intermediate dc voltage is between 5 volts to 60 volts.

16. The power device of claim 13, further comprising a second housing, and the second housing encloses the ac-dc converter and the at least one output port.

17. The power device of claim 13, wherein further comprises at least one connecting line, first terminal of the each connecting line is connected to the ac-dc converter, and second terminal of the each connecting line is connected to one of the output ports; and a second housing encloses the ac-dc converter and the first terminal of the each connecting line.

18. The power device of claim 13, wherein the output terminal is further connected to the external device, and the output terminal is configured to transmit a communication signal between the DC-DC converter and the external device while transmitting the output voltage to the external device.

19. The power device of claim 13, wherein the dc transmission cable only comprises power transmission line configured to transmit the intermediate dc voltage.

20. The power device of claim 13, wherein the dc-dc converter comprises a non-isolated buck power converting circuit and the non-isolated buck power converting circuit comprises a synchronous rectifier unit.

* * * * *